Figure 1:
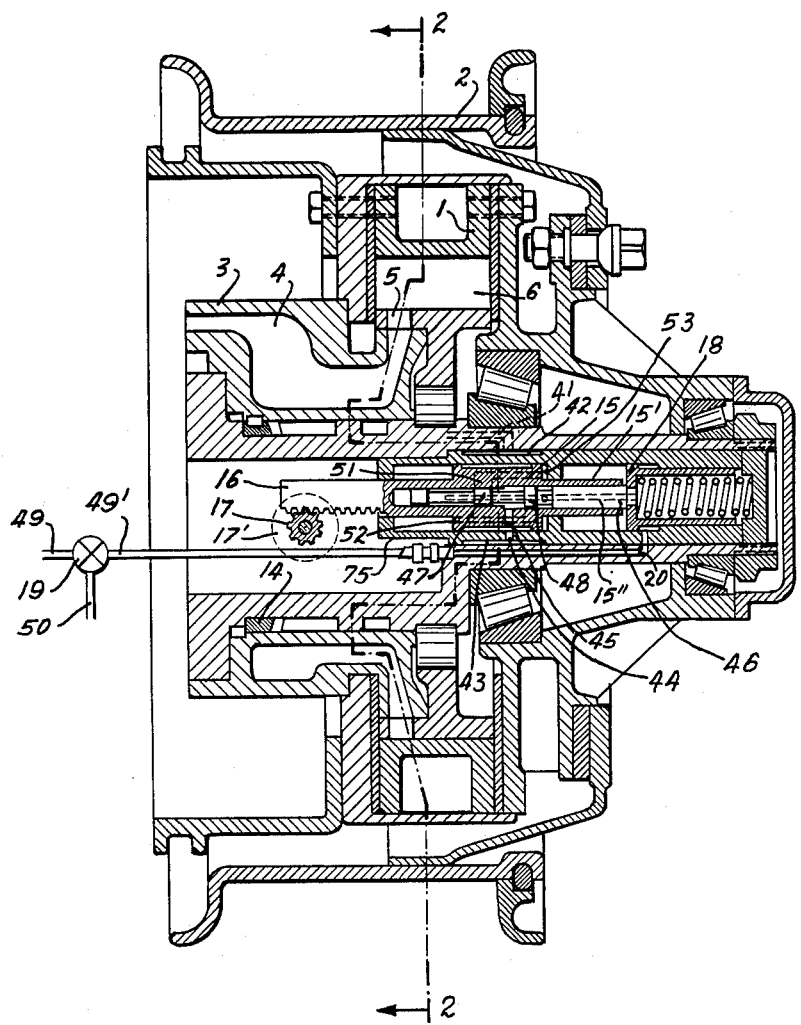

March 20, 1956   O. NÜBLING   2,738,849
HYDRAULIC DRIVE FOR VEHICLE
Filed Oct. 24, 1951   4 Sheets-Sheet 1

INVENTOR:
Otto Nübling
by Michael S. Striker
Agent

March 20, 1956     O. NÜBLING     2,738,849
HYDRAULIC DRIVE FOR VEHICLE

Filed Oct. 24, 1951     4 Sheets-Sheet 4

United States Patent Office 2,738,849
Patented Mar. 20, 1956

2,738,849
HYDRAULIC DRIVE FOR VEHICLE

Otto Nübling, Bremen-Huchting, Germany, assignor to Firma Theodor Klatte, Bremen-Huchting, Germany Application October 24, 1951, Serial No. 252,961

Claims priority, application Germany October 24, 1950

9 Claims. (Cl. 180—66)

The present invention relates to an improvement for hydraulic drives for vehicles, and more particularly to an apparatus for separating a hydraulic motor driving a single wheel of a vehicle when the hydraulic motor and the associated wheel are spinning due to a differential effect of the hydraulic drive.

Hydraulic drives for vehicles are known in which each wheel of the vehicle is separately driven by a hydraulic motor while all hydraulic motors are supplied with an operating liquid by a single pump.

In the event that a vehicle driven by a hydraulic drive of this type rests with one wheel on a slippery ground, or in the event that one of the wheels cannot exert any traction due to an uneven surface of the ground, the respective wheel will spin at an excessive speed, while all other wheels cannot exert any traction since the pressure of the liquid supply drops. This effect is comparable to the differential effect occurring in vehicles provided with differential gears.

It is an object of the present invention to overcome this disadvantage and to provide means for separating the hydraulic motor of a spinning wheel from the hydraulic drive of the vehicle.

It is another object of the present invention to provide a control valve in each hydraulic motor which permits separating of the hydraulic motor from the supply of operating liquid while at the same time permitting rotation of the wheel when the vehicle is moved by the action of the other wheels.

It is a further object of the present invention to provide means for adjusting the control valves independently of each other for separating a spinning hydraulic motor and associated wheel from the supply of operating liquid.

It is a still further object of the present invention to provide means indicating which wheel and associated hydraulic motor of the vehicle is spinning so that the operator of the vehicle may manually operate the means for adjusting the control valves.

It is a still further object of the present invention to provide means for automatically operating the control valve of a spinning motor when the excessive speed of rotation of the spinning motor and associated wheel causes an excessive difference between the speed of the spinning wheel and other wheels.

It is a still further object of the present invention to provide an electric arrangement for automatically operating the control valves of hydraulic motors.

With these objects in view, the present invention is applied to a vehicle having a set of wheels and provided with a pump, drive means for driving the pump, a set of hydraulic motors driven by the pump, each of the hydraulic motors being associated with one of the wheels for driving the same according to the present invention, a plurality of control valves communicate with the pump on one hand and with one of the hydraulic motors on the other hand. Each of the control valves may be operated independently of the other control valves and is movable from an operative position—permitting supply of an operating liquid to the suction side of the corresponding hydraulic motor and discharge of the liquid from the pressure side thereof—to an inoperative position in which the pressure and the suction side of the corresponding hydraulic motor are connected by the control valve.

In inoperative position the control valve permits unhindered circulation of the operating liquid in the hydraulic motor without supply and discharge of the operating liquid.

Furthermore, means are provided for separately operating a control valve when surface conditions of the ground cause spinning of a wheel. When the control valve of the spinning wheel is placed in inoperative position, the hydraulic motor is separated from the pump so that the other hydraulic motor can exert traction and move the vehicle. Since the circulation within the hydraulic motor is not hindered, the hydraulic motor and the associated wheel are freely rotatable and rotate while the vehicle is moved by the action of the other hydraulic motors and wheels until the separated hydraulic motor is again connected to the pump by moving the control valve into operative position by a suitable means.

Manually operable means may be provided for operating any one control valve, and indicating means may indicate to the operator of the vehicle which of the wheels is spinning.

However, according to a preferred embodiment of the present invention an electric arrangement may be provided for automatically operating the control valve of the hydraulic motor associated with a spinning wheel. This electric arrangement may be applied to a pair of wheels rotating about a common axis.

According to a preferred embodiment of the present invention each wheel drives a small electric generator. When one of the wheels rotates at an excessive speed the difference between the speeds of rotation of the two generators causes a difference in the voltages produced by the generators and the differential voltage is utilized to energize an electric magnet which in turn actuates the respective control valve by suitable operating means.

Preferably hydraulic motors of a known type are used which consist of an outer rotatable element having an inner gear engaging an outer gear on an inner rotatable element. The control valve is arranged in the interior of the inner rotatable element, while the outer rotatable element is secured to the inside of the rim of the wheel.

Figure 2:
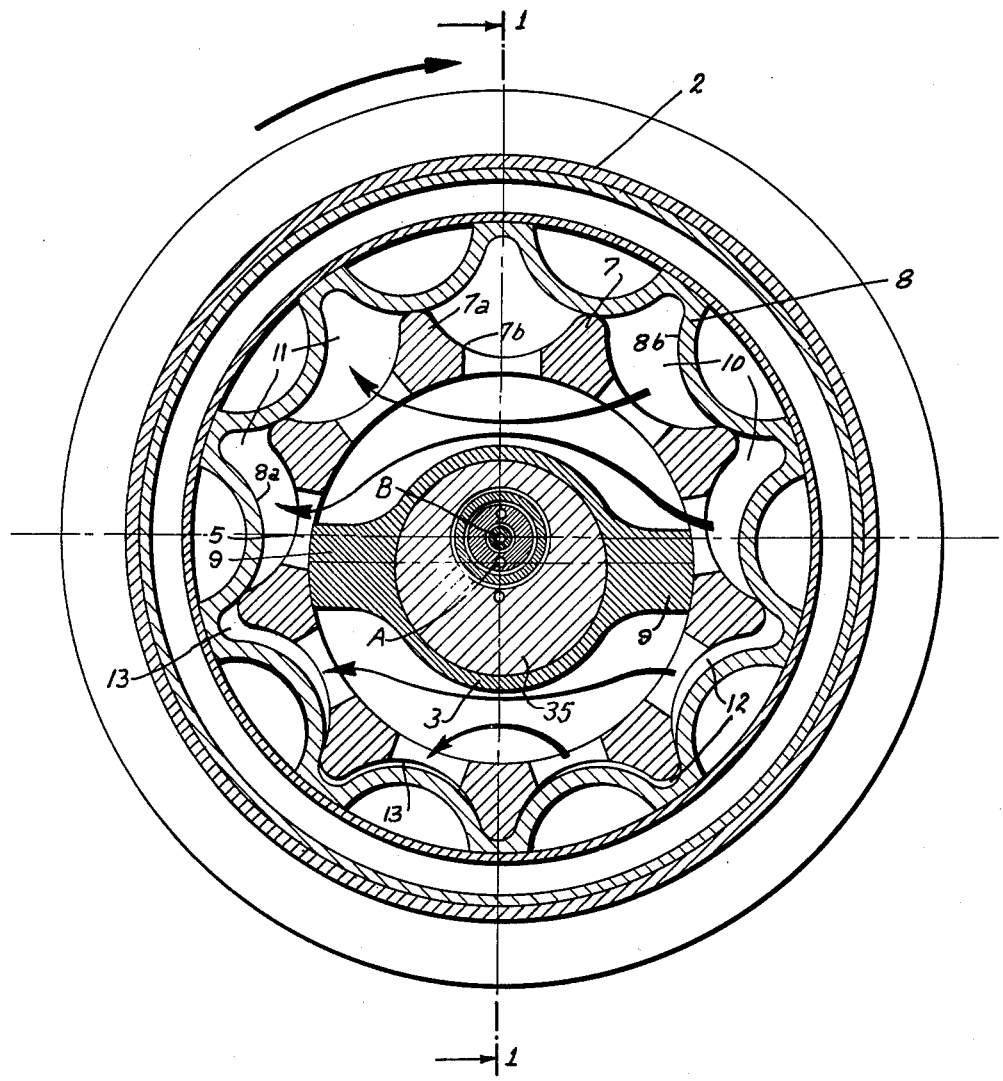
Figure 3:
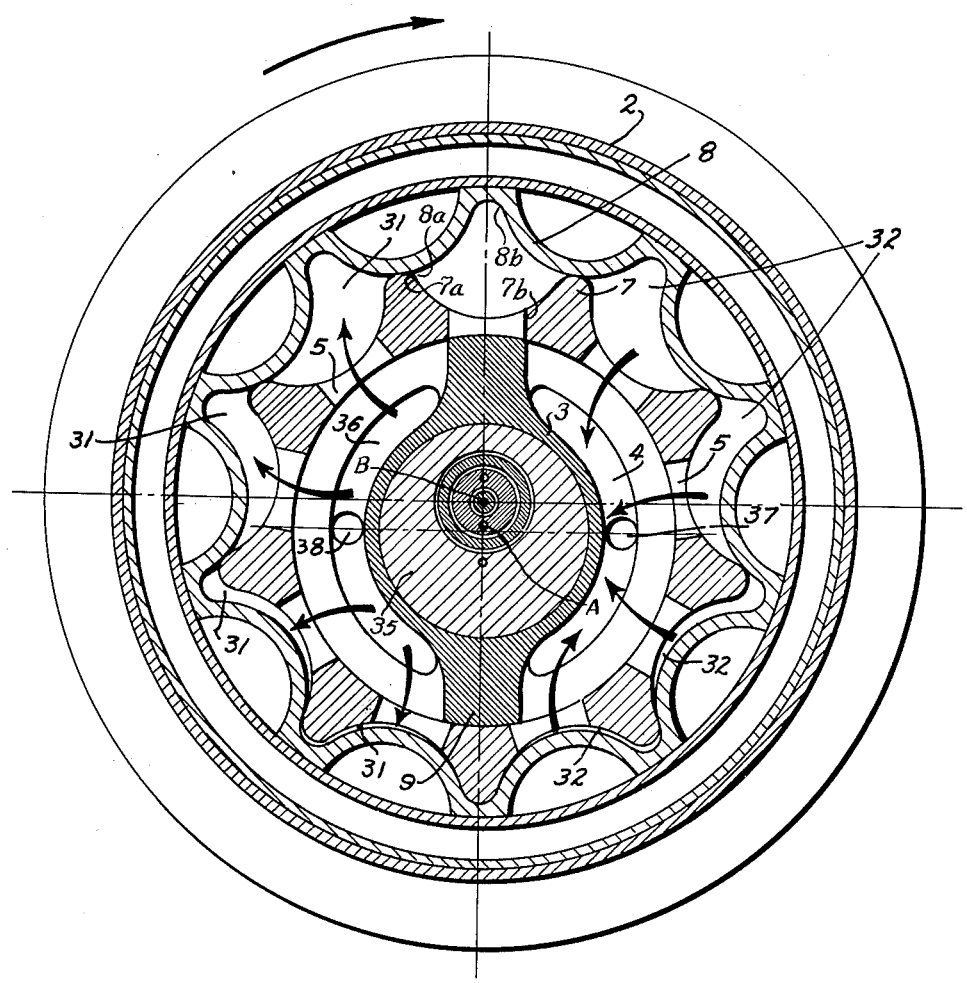
Figure 4:
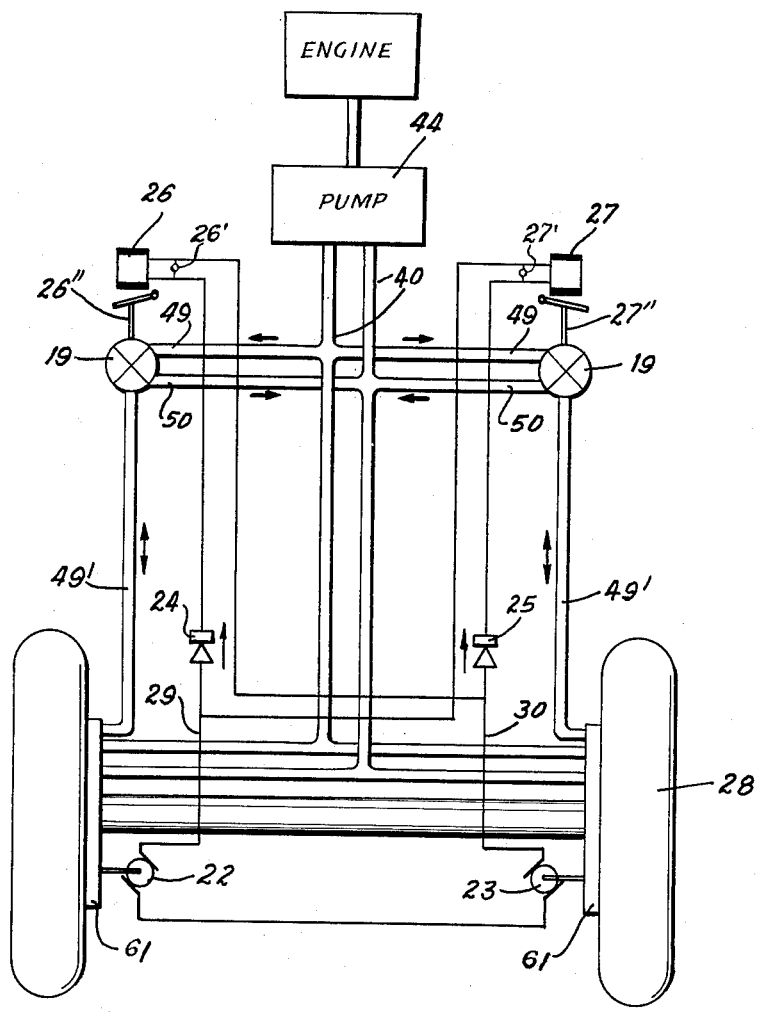

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal sectional view of a hydraulic motor according to the present invention taken on line 1—1 in Fig. 2;

Fig. 2. is a cross-sectional view of a hydraulic motor mounted in a vehicle wheel taken on line 2—2 in Fig. 1;

Fig. 3 is a cross-sectional view of a hydraulic motor showing the control valve in another position; and Fig. 4 is a diagrammatic view of an automatic electric actuating arrangement.

Referring now to the drawings, Figure 1 shows a hydraulic motor 1 built into a wheel 2. The operating liquid is supplied to and discharged from the motor 1 by the control valve 3 through two separate conduits 4 and 36 of which conduit 4 can only be seen in Fig. 1. The operating liquid is guided through openings 5 in the valve 3 to the chambers 6 of a rotary hydraulic gear motor. For regulating the motor the control valve 3 is turnable through approximately 90°.

The bore 41 communicates permanently with the pressure oil conduit to the hydraulic motor. The pressure oil flows through the annular spaces 42 and 43 and the bores 44 and 45 to the control slide valve 46, which governs the movement of the piston 15 and turns the valve 3 for regulation by means of rack 16 secured to piston 15 and meshing with gear wheel 17 which, through coaxially mounted gear 17' engages gear wheel 14 secured to the valve 3. The control slide valve 46 has the secondary task to return the auxiliary piston 18 into the starting position. It is provided with two control collars 47 and 48, which differ from each other in diameter. Valve 19 is a three-way selector cock valve in which the discharge pipe 50 is opened as the supply pipe 49 is shut off by said valve 19. Now the pressure oil entering through the bore 41, presses upon the differential annular surface formed by the collars 47 and 48 and thus urges the slide valve 46 and the auxiliary piston 18 to the right as seen in Fig. 1 into the starting position. The oil displaced by piston 18 is discharged through the pipe 50. As the annular surface of piston 18 is by far larger than the effective face of the slide valve 46, a sufficiently great surplus power is available after opening the valve 19 to move the slide valve to the left, even if the bore 41 should be under pressure.

After cutting in the differential pawl, the piston 18 abuts against the sleeve of part 15'. The oil ducts 51 and 52 are thereby cleared by the control collars 47 and 48, so that pressure oil from bore 41 can penetrate into the annular space 53. Consequently, piston 18 will cooperate with piston 15 to move the rack 16 and to turn the slide valve 3.

The operation of the hydraulic motor can be better understood from Figs. 2 and 3 which show the arrangement of the rotary hydraulic gear motor in cross-section. A rotatable hollow inner member 7 has an axis A and is surrounded by an outer annular member 8 which is mounted eccentrically thereto for rotation about an axis B. The inner member 7 is provided on its perimeter with a plurality of teeth 7a meshing with inner teeth 8a of the outer annular member 8. The number of teeth of the hollow inner member 7 is one less than the number of teeth of the outer annular member. The depressed portions 7b and 8b, respectively, between the teeth of the inner and the outer members form together chambers 10, 11, 12 and 13. During rotation in the direction of the arrow the chambers 13 and 11 are increasing in volume while the chambers 10 and 12 are decreasing in volume. The control valve 3 does not rotate with members 7 and 8 but is turnable on shaft 35 in the interior of the inner member 7 from a position in which the free wall portions 9 of the control valve 3 extend in the direction of the eccentricity as shown in Fig. 3, to a position normal thereto, as shown in Fig. 2.

Fig. 3 shows the control valve 3 with channels 4 and 36 to which the operating liquid is supplied and discharged respectively by means of supply conduit 37 and discharge conduit 38.

In the normal position of the control valve shown in Fig. 3, the free wall portions 9 of the control valve 3 extend in the direction of the eccentricity defined by the axes A and B and the supplied operating liquid forces the chambers 31 to increase in volume whereby both members 7 and 8 are rotated. The chambers 32 which are decreasing in volume press the operating liquid back into the discharge conduit 38. Fig. 2 shows the control valve 3 turned through an angle of 90° so that the free wall portion 9 extends normal to the line A—B. In this inactivating position the operating liquid forced out of chambers 10, flows into the chambers 11, and the liquid forced out of the chambers 12 flows into the chambers 13. Since the quantity of operating liquid displaced out of chambers 10 and 12 is the same as the quantity sucked into chambers 11 and 13, no operating liquid can be supplied to or discharged from the hydraulic motor, and consequently no power is transmitted to the wheel to which the outer member 8 is fixedly secured. Consequently, the wheel is freely rotatable, since the resistance against rotation caused by the inner circulation of the operating liquid from chambers 10 and 12 to chambers 11 and 13 is negligible.

In the intermediate positions of the control valve 3 only a part of the operating liquid circulates within the chambers between the inner and the outer members while another part thereof is supplied and discharged through bores 37 and 38, respectively. By turning the control valve to an intermediate position, the speed of rotation of the hydraulic motor and of the vehicle may be regulated in a known manner. The present invention is only concerned with an arrangement for placing the control valve into the inoperative end position shown in Fig. 2 for separating a wheel spinning at an excessive speed.

Fig. 1 shows an embodiment according to which the control valve 3 may be turned by means of a bevel gear 14 which is fixedly secured thereto. A servomotor 75, which is not an object of the present invention, is fixedly connected to a rack bar 16 which engages a pinion 17 which is connected for common rotation with a coaxial bevel pinion 17' meshing with the bevel gear 14. When the servomotor is operated by means which are not an object of the present invention, the valve is turned into a position between the two positions shown in Figs. 2 and 3 for regulating the speed of the hydraulic motor.

For overriding the action of the regulating means an auxiliary piston 18 is provided. When a valve 19 is opened in a manner which will be explained hereafter, operating liquid is supplied through the conduits 49' and 20 and urges the piston 18 to the left of Fig. 1. The piston 18 engages a sleeve 15' and also the valve control bar 15" of the servomotor 75 and moves the servomotor 75 and the rack bar 16 connected thereto to the left of Fig. 1, whereby pinions 17, 17' and bevel gear 14 are rotated and turn the control valve in the position shown in Fig. 2, in which the hydraulic motor is separated from the supply and discharge of operating liquid.

Fig. 4 is a diagrammatic view of the arrangement of the hydraulic drive. A pump 44 supplies and discharges the operating liquid through conduits 40 to the hydraulic drive means 61 which are built into the wheels of a vehicle. A conduit 49 supplies liquid to the spring loaded valve 19 guided around pulleys 43'. When the valve 19 is opened, the liquid passes through conduit 49' and 20, to the auxiliary piston 18 for operating the control valve 3 by means of a servomotor 75, the rack bar 16, the gear means 17 and the bevel gear 14 as shown in Fig. 1.

According to a preferred embodiment of the present invention automatic electrical control means are provided for disconnecting a hydraulic motor which rotates at excessive speed. Hydraulic motors 61 are built into a pair of wheels 28. Each wheel or traction element 28 drives a small direct current generator 22 and 23, respectively, which may be constructed similar to the generators for producing current for speedometers. Each of the direct current generators 22 and 23 is connected in series to the other generator, to the magnet coil 26 or 27, respectively, and to a rectifier 24 or 25, respectively. Rectifier 24 and magnet coil 26 are connected in parallel to rectifier 25 and magnet coil 27. Each magnet coil is operatively connected to a valve 19 by means of a movable core and by operating means 26" and 27".

The device operates as follows:

When the wheels 28 rotate at the same speed, the voltages produced by the generators 22 and 23 are equal, and no current flows through the conductors 29 and 30. In the event that one of the wheels 28 cannot exert traction due to unfavorable ground conditions, it begins to spin at an excessive speed, the voltage produced by the associated generator is increased and exceeds the voltage of the other generator. At a predetermined speed difference the difference between the voltages of the two generators is sufficient to actuate the magnets 26, and 27, respectively. The rectifiers 24, and 25, respectively, permitting the direct current produced by the generators to pass only in the direction of the arrows, are connected in series with the magnets 26 and 27, respectively, so that only one magnet may be actuated. If, for instance, generator 22 rotates faster than generator 23 producing a higher voltage, the rectifier 25 blocks the current which can only flow to magnet 26 through rectifier 24 in the direction of the arrow causing actuation of the valve 19 which is connected to the movable armature of the magnet. In a similar manner only the magnet 27 is energized when the voltage of the generator 23 exceeds the voltage of the generator 22. The two generators 22 and 23 are preferably combined in one device.

By the automatic electrically operated control means 19, 22, 23, 29, 25, 26, 27 the control number 9 of any hydraulic motor is turned to the position in which the hydraulic motor is separated from the supply and discharge of operating liquid, as soon as the speed of the associated wheel considerably exceeds a predetermined limit.

Indicating means 26' and 27' such as signal lamps, may be provided for indicating to the operator of the vehicle which wheel rotates at an excessive speed. The indicating lamps are energized in similar manner as electro-magnets 26 and 27, respectively, when excessive rotary speed of a wheel produces a difference between the voltages of the two generators and may be provided in addition to the electro-magnets or in combination with manually operated actuating means.

It will be understood that each of the elements described above, or two or more together, may also find a useful application in other types of drives for vehicles differing from the types described above.

While the invention has been illustrated and described as embodied in an apparatus for separating a hydraulic motor driving a single wheel of a vehicle from the supply of operating liquid when ground conditions cause excessive rotary speed of hydraulic motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a driving arrangement for a vehicle having a set of wheels, said driving arrangement including a pump, drive means for driving said pump, a set of hydraulic motors each of said hydraulic motors being connected for rotation with one of said wheels for driving the same, in combination, a plurality of control valves, each of said control valves formed with two conduits communicating with said pump on one hand, and with one of said hydraulic motors on the other hand, each control valve mounted in one of said hydraulic motors and operable independently of the other control valve and turnable from an operative position permitting supplying an operative liquid to the suction side of the corresponding hydraulic motor through one of said conduits and discharging said liquid from the pressure side thereof through the other of said conduits, to an inoperative position in which said pressure side and said suction side of said corresponding hydraulic motor are connected by said two conduits permitting unhindered inner circulation of the operating liquid without supply and discharge of operating liquid; a set of servomotors, each of said servomotors operatively connected to a corresponding one of said control valves for turning the same into inoperative position so as to permit free rotation of the wheel associated with the corresponding hydraulic motor independently of the other wheels driven by the other hydraulic motors; control means operatively connected to said wheels and adapted to be actuated when one of said wheels rotates at a speed greater by a predetermined amount than the speed of the other wheels; and operating means operatively connecting said control means with each of said servomotors so as to start a servomotor when said control means are actuated by the wheel corresponding to said servomotor.

2. In a driving arrangement for a vehicle having a set of wheels, said driving arrangement including a pump, drive means for driving said pump, a set of hydraulic motors driven by said pump, each of said hydraulic motors connected for rotation with one of said wheels for driving the same, in combination, a plurality of control valves, each of said control valves formed with two conduits communicating with said pump on one hand, and with one of said hydraulic motors on the other hand, each control valve mounted in one of said hydraulic motors and operable independently of the other control valves and turnable from an operative position permitting supplying an operative liquid to the suction side of the corresponding hydraulic motor through one of said conduits and discharging said liquid from the pressure side thereof through the other of said conduits, to an inoperative position in which said pressure side and said suction side of said corresponding hydraulic motor are connected by said two conduits permitting unhindered inner circulation of the operating liquid without supply and discharge of operating liquid; means for separately operating any one of said control valves for turning the same into inoperative position so as to permit free rotation of the wheel associated with the corresponding hydraulic motor independently of the other wheels driven by the other hydraulic motors; and control means operatively connected to said wheels and to said means for separately operating any one of said control valves, and adapted to cause operation of the corresponding control valves when one of said wheels rotates at a speed greater by a predetermined amount than the speed of another of said wheels.

3. In a driving arrangement for a vehicle having at least two driven wheels, said driving arrangement including a pump, drive means for driving said pump, a set of hydraulic motors driven by said pump, each of said hydraulic motors connected for rotation with one of said wheels for driving the same, in combination, a plurality of control valves formed with conduit means, each of said control valves communicating through said conduit means with said pump on one hand, and with one of said hydraulic motors on the other hand, each of said control valves being operable independently of the other control valves and movable from an operative position permitting supply of an operating liquid through said conduit means to the suction side of the corresponding hydraulic motor and discharge of said liquid through said conduit means from the pressure side thereof to an inoperative position in which said pressure side and said suction side of said corresponding hydraulic motor are connected by said conduit means so as to permit unhindered circulation of the operating liquid therein without supply and discharge of operating liquid; at least two direct current generators, each of said two generators being driven by one of said hydraulic motors and having two terminals, one terminal of one generator connected with one terminal of the other generator; two rectifiers, each rectifier having two terminals, one terminal of one rectifier connected to the other terminal of one generator, and one terminal of the other rectifier connected to the other terminal of the other generator; two electrical magnet windings, one of said magnet windings connected at one end thereof to the other terminal of said one rectifier and at the other end thereof to said other terminal of said other generator, and the other of said magnet windings connected at one end thereof to the other terminal of said other rectifier and at the other end thereof to said other terminal of said one generator, so that one of said magnet windings is energized when, due to increased speed of the corresponding hydraulic motor, the voltage of one generator exceeds the voltage of the other generator; two magnet cores, one of said magnet cores associated with and actuated by said one of said magnet windings, and the other of said magnet cores associated with and actuated by the other of said magnet windings; and at least two operating means, each of said operating means actuated by one of said cores and operatively connected to one of said control valves for moving said one control valve into inoperative position when the magnet winding corresponding to the hydraulic motor associated with said one control valve is energized.

4. A driving arrangement according to claim 3 wherein each of said operating means includes a servomotor; and a valve for actuating said servomotor.

5. A driving arrangement according to claim 3 and including at least two electric indicator means, each of electric indicator means connected in parallel to one of said electrical magnet windings and adapted to be actuated by a voltage difference between said two generators.

6. In a driving arrangement for a vehicle having at least two traction elements and drive means for separately driving each of the traction elements, in combination control members connected with each of said drive means, each of said control members movable between two positions and in one position adapted to inactivate the drive means of the associated traction element; at least two direct current generators, each of said two generators driven by one of said wheels and having two terminals, one terminal of one generator connected with one terminal of the other generator; two rectifiers, each rectifier having two terminals, one terminal of one rectifier connected to the other terminal of one generator, and one terminal of the other rectifier connected to the other terminal of the other generator; two electrical magnets each including a winding and a core, one of said magnet windings connected with one end thereof to the other terminal of said one rectifier and at the other end thereof to said other terminal of said other generator, and the other of said magnet windings connected at one end thereof to the other terminal of said other rectifier and at the other end thereof to said other terminal of said one generator, so that each of said magnet windings is energized when, due to increased speed of the corresponding wheel the voltage of one generator exceeds the voltage of the other generator; and operating means operatively connecting each of said cores with one of said control means so as to move said control member to said one position inactivating the drive means of the associated traction element when the corresponding electrical magnet is energized when the corresponding generator rotates at a speed higher than the speed of the other generator.

7. In a driving arrangement for a vehicle, in combination, at least two traction elements, a pump, drive means for driving said pump, a set of hydraulic motors driven by said pump, each of said hydraulic motors connected with one of said traction elements for driving the same, at least two direct current generators, each of said two generators being driven by one of said hydraulic motors and having two terminals, one terminal of one generator connected with one terminal of the other generator; two rectifiers, each rectifier having two terminals, one terminal of one rectifier connected to the other terminal of one generator, and one terminal of the other rectifier connected to the other terminal of the other generator; two electric indicating means, each having two terminals, one of said indicating means connected with one terminal to the other terminal of said one rectifier and with the other terminal thereof to said other terminal of said other generator, and the other of said electric indicating means connected at one terminal thereof to the other terminal of said other rectifier and at the other terminal thereof to said other terminal of said one generator so that one of said indicating means is actuated when due to a speed increase of the corresponding hydraulic motor relative to the other generator the voltage of one generator exceeds the voltage of the other generator.

8. In a driving arrangement for a vehicle, in combination, at least two traction elements; at least two rotary drive means, each drive means connected to one of said traction elements for driving the same; at least two control members, each control member connected to one of said drive means and being movable between a normal position and an inactivating position, and adapted to inactivate in said inactivating position the drive means connected thereto; and control means operatively connected at one hand to said traction elements, and on the other hand to said control members, and moving anyone of said control members to said inactivating position when the rotary drive means corresponding to the respective control member rotates at a speed greater by a predetermined amount than the speed of the other of said drive means.

9. A driving arrangement as claimed in claim 2, and including a set of indicating means connected to said control means and being actuated when one of said drive means rotates at a speed higher than the speed of the other of said drive means.

References Cited in the file of this patent

UNITED STATES PATENTS

| 958,212 | Baab | May 17, 1910 |
| 1,080,281 | Kellogg | Dec. 2, 1913 |
| 1,081,810 | Carey | Dec. 16, 1913 |
| 1,294,121 | Lape | Feb. 11, 1919 |
| 1,354,777 | Rock | Oct. 5, 1920 |
| 1,590,226 | Boisset | June 29, 1926 |
| 1,922,887 | Ellis | Aug. 15, 1933 |
| 2,376,699 | Jandasek | May 22, 1945 |
| 2,393,324 | Joy | Jan. 22, 1946 |
| 2,679,300 | Nubling | May 25, 1954 |